United States Patent
Boesen et al.

(10) Patent No.: US 10,225,638 B2
(45) Date of Patent: Mar. 5, 2019

(54) EAR PIECE WITH PSEUDOLITE CONNECTIVITY

(71) Applicant: BRAGI GmbH, München (DE)

(72) Inventors: Peter Vincent Boesen, München (DE); Darko Dragicevic, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/799,845

(22) Filed: Oct. 31, 2017

(65) Prior Publication Data
US 2018/0124490 A1    May 3, 2018

Related U.S. Application Data

(60) Provisional application No. 62/417,027, filed on Nov. 3, 2016.

(51) Int. Cl.
H04R 5/02 (2006.01)
H04R 1/10 (2006.01)
(Continued)

(52) U.S. Cl.
CPC ............. H04R 1/1016 (2013.01); G01S 5/14 (2013.01); H04B 1/385 (2013.01); H04R 1/1091 (2013.01);
(Continued)

(58) Field of Classification Search
CPC . H04S 7/30; H04S 7/303; H04S 7/304; H04S 3/008; H04R 1/1016; H04R 1/1041;
(Continued)

(56) References Cited

U.S. PATENT DOCUMENTS 2,325,590 A    8/1943   Carlisle et al.
2,430,229 A    11/1947  Kelsey
(Continued)

FOREIGN PATENT DOCUMENTS

CN    204244472 U    4/2015
CN    104683519 A    6/2015
(Continued)

OTHER PUBLICATIONS

Wikipedia, "Wii Balance Board", "https://en.wikipedia.org/wik/Wii_Balance_Board", 3 pages, (Jul. 20, 2017).
(Continued)

*Primary Examiner* — Thang V Tran
(74) *Attorney, Agent, or Firm* — Goodhue, Coleman & Owens, P.C.

(57) ABSTRACT

An earpiece includes an earpiece housing and a location receiver disposed within the ear piece housing. The earpiece is configured to determine location of the earpiece using the location receiver. The ear piece is configured to generate three-dimensional sounds based on the location of the earpiece relative to location of one or more sound sources. The location receiver may be configured to receive signals from one or more pseudo satellites and use the signals to determine the location. The earpiece may be configured to receive signals from one or more terrestrial or ground-based transmitters and use the signals to determine the location. The ear piece may further include an inertial sensor disposed within the earpiece housing.

12 Claims, 4 Drawing Sheets

(51) Int. Cl.
*H04B 1/3827* (2015.01)
*G01S 5/14* (2006.01)
*H04S 7/00* (2006.01)
*H04R 5/033* (2006.01)

(52) U.S. Cl.
CPC ............ *H04R 1/1041* (2013.01); *H04R 5/033* (2013.01); *H04R 2420/07* (2013.01); *H04R 2460/07* (2013.01); *H04R 2460/13* (2013.01); *H04S 7/304* (2013.01)

(58) Field of Classification Search
CPC .... H04R 1/1091; H04R 3/00; H04R 2460/07; H04R 2460/13; H04R 5/033; G01S 5/14; H04B 1/385
See application file for complete search history.

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,848,273 B1 * | 12/2017 | Helwani ................. H04S 7/304 |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |

(56) References Cited

U.S. PATENT DOCUMENTS

| | | |
|---|---|---|
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0187163 A1 | 8/2008 | Goldstein et al. |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0110587 A1 | 4/2015 | Hori |
| 2015/0124975 A1* | 5/2015 | Pontoppidan ........ H04R 25/552 381/23.1 |
| 2015/0148989 A1 | 5/2015 | Cooper et al. |
| 2015/0189449 A1* | 7/2015 | Udesen ................. H04R 25/43 381/315 |
| 2015/0245127 A1 | 8/2015 | Shaffer |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0112811 A1* | 4/2016 | Jensen .................. H04R 5/033 381/17 |
| 2016/0125892 A1 | 5/2016 | Bowen et al. |
| 2016/0182294 A1* | 6/2016 | Erickson ................ H04W 4/02 370/338 |
| 2016/0353196 A1 | 12/2016 | Baker et al. |
| 2016/0360350 A1 | 12/2016 | Watson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0142511 A1 | 5/2017 | Dennis |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0263236 A1 | 9/2017 | Boesen et al. |

(56) References Cited

U.S. PATENT DOCUMENTS

| | | | |
|---|---|---|---|
| 2017/0273622 | A1 | 9/2017 | Boesen |
| 2018/0041848 | A1* | 2/2018 | Nielsen ............... H04R 25/552 |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 4/1981 |
| GB | 2508226 | A | 5/2014 |
| WO | 2008103925 | A1 | 8/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |

OTHER PUBLICATIONS

Akkermans, "Acoustic Ear Recognition for Person Identification", Automatic Identification Advanced Technologies, 2005 pp. 219-223.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People ©BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 16, 2015).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Califorma (2017).
International Search Report & Written Opinion, PCT/EP2016/070231 (Nov. 18, 2016).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Nikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).

* cited by examiner

EAR PIECE WITH PSEUDOLITE CONNECTIVITY

RELATED APPLICATION

This application claims priority to U.S. Provisional Patent Application No. 62/417,027 filed Nov. 3, 2017, hereby incorporated by reference in its entirety.

FIELD OF THE INVENTION

The present invention relates to wearable devices. More particularly, but not exclusively, the present invention relates to ear pieces.

BACKGROUND

Location information for ear pieces may be used for a number of different purposes. One purpose may be to allow a user to receive information about the user's location via global positioning signals, "GPS" signals. However, these current systems contain several limitations. Where the ear pieces are worn by a user who is also carrying a smart phone or other mobile device which includes a GPS receiver and which are in wireless communication with the ear pieces such as over a Bluetooth Low Energy (BLE) or Bluetooth link, the location of the ear pieces may be inferred. If the user is wearing only an earpiece and does not bring the electronic device, a GPS signal may not be received. Also, GPS signals are not always readily available such as when indoors or in other locations where the signal is blocked in whole or part. Sometimes GPS signals can be received, but may be of limited accuracy due to limitations on the number of satellites which may be in view. For example, steep terrain or large building structures may block GPS signals or reduce the accuracy of any location derived from them. While GPS signals provide some solutions to the problem of determining a user's general location, there is a need to provide a better means of determining a user's location. In addition, the ear piece(s) may be used independently of a smart phone or another mobile device. What is needed is an improved ear piece which provides location information.

SUMMARY

Therefore, it is a primary object, feature, or advantage of the present invention to improve over the state of the art.

It is a further object, feature, or advantage of the present invention to provide an earpiece capable of determining its location.

It is a still further object, feature, or advantage of the present invention to provide an earpiece capable of determining its position independently from a device which it is paired with.

Another object, feature, or advantage is to provide an earpiece capable of determining its position without requiring a GPS receiver or line of sight to satellites.

Yet another object, feature, or advantage is to provide an ear piece capable of determining its position even when indoors.

A still further object, feature, or advantage is to provide an ear piece which provides for local positioning.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect an earpiece includes an earpiece housing and a location receiver disposed within the ear piece housing. The earpiece is configured to determine location of the earpiece using the location receiver. The ear piece is configured to generate three-dimensional sounds based on the location of the earpiece relative to location of one or more sound sources. The location receiver may be configured to receive signals from one or more pseudo satellites and use the signals to determine the location. The earpiece may be configured to receive signals from one or more terrestrial or ground-based transmitters and use the signals to determine the location. The ear piece may further include an inertial sensor disposed within the earpiece housing.

According to another aspect, a system includes at least one pseudolite and a set of earpieces comprising a left ear piece and a right ear piece, each of the earpieces comprising an ear piece housing, at least one speaker, at least one microphone, a wireless transceiver disposed within the ear piece housing; and a location receiver configured to receive signals from the at least one pseudo satellite. One or both earpieces may be configured to determine location of the ear piece relative to a sound source using the location receiver. The set of ear pieces may be configured to generate three-dimensional sound effects using location of the sound source and the location of the ear piece.

According to another aspect, a method of using an earpiece includes steps of determining position of the ear piece using a location receiver disposed within the earpiece using communications from at least one terrestrial-based location transmitter, determining a position of a sound source, generating three-dimensional sound effects using the position of the sound source and the position of the ear piece, and producing the sound effects at the ear piece. The method may further include determining position of a second ear piece in operative communication with the ear piece using an offset. The method may further include generating three-dimensional sound effects for the second ear piece using the position of the sound source and the position of the second ear piece. The method may further include determining position of a second ear piece in operative communication with the ear piece independently using a location receiver within the second ear piece. The method may further include generating three-dimensional sound effects for the second ear piece using the position of the sound source and the position of the second ear piece.

DETAILED DESCRIPTION

Figure 1:
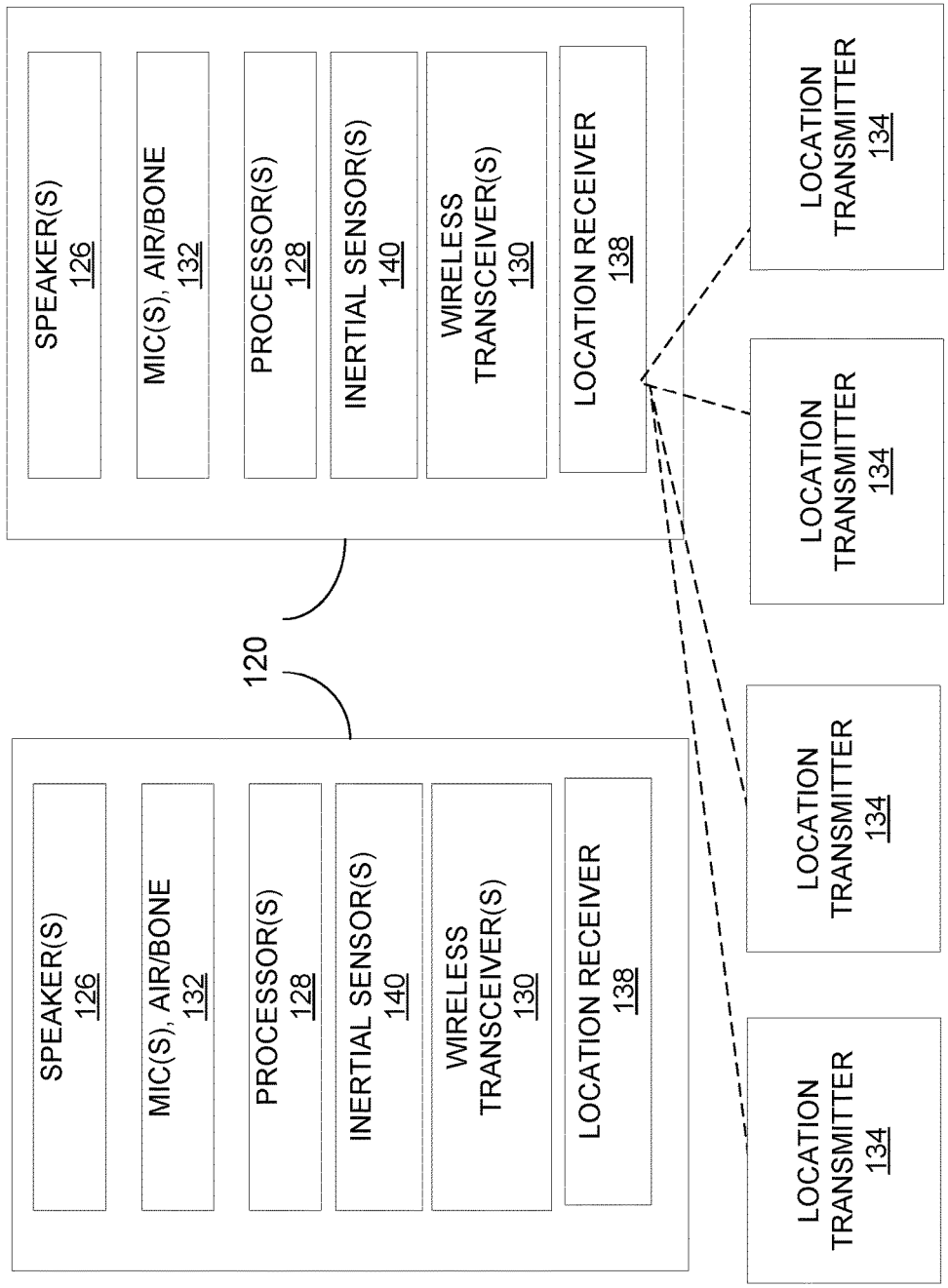
FIG. 1 is a block diagram depicting one embodiment of the earpieces communicating with the location transmitters of the pseudosatellites.

As shown in FIG. 1, a number of location transmitters 134 are shown, each which may be associated with a pseudolite.

Each of the location transmitters 134 sends radio-based signals to a location receiver 138 in the earpiece(s) 120. As used herein, the term pseudolite (interchangeable with pseudosatellite) is used to refer to a ground-based location transmitter which transmits a signal which may be received by a location receiver 138 and used to determine the location of the location receiver 138. Radio-based signals provide a precise means of transmitting information over long ranges.

As displayed in FIG. 1, the earpieces 120 may contain many components, including but not limited to speakers 126, microphones 132 which may transmit sound via air or through bone conduction, processors 128, inertial sensors 140, wireless transceivers 130, and location receivers 138. The processor 128 may include one or more processors which may include a digital signal processor or sound processor which provides for generating audio including audio with three-dimensional sound effects. Various transformations may be used to generate audio with three-dimensional sound effects including those which may be parameterized by relative locations of one or more of the ear pieces relative to one or more sound sources. The inertial sensors 140 may provide for tracking movement of the ear pieces which may be further used to refine orientation or position of the ear pieces which may also be used in generating audio with three-dimensional sound effects. The location transmitter 134 in the pseudolite may modulate the radio-based signal using amplitude, angle, frequency, or phase modulation. The location transmitter 134 may modulate the signal with amplitude modulation by transmitting information via a radio carrier wave. The signal strength of the carrier wave would vary in proportion to the waveform that is being transmitted. In another embodiment, the location transmitter may use angle modulation to send the signal. The location transmitter may alter the angle of a sine-wave carrier. Two forms of angle modulation include frequency and phase modulation. The location transmitter may use frequency modulation to vary the instantaneous frequency of the wave, thereby changing the encoding of information in the carrier wave. Any number of different methodologies may be used to create these types of signal modulations or other types of signals which may be used in order to determine location. Time differences in arrivals from different location transmitters 134 to the location receivers 138 may be used to determine location of an earpiece. Where there are multiple earpieces, the earpieces may be in operative communication with one another to improve the accuracy of location determination.

Figure 2:
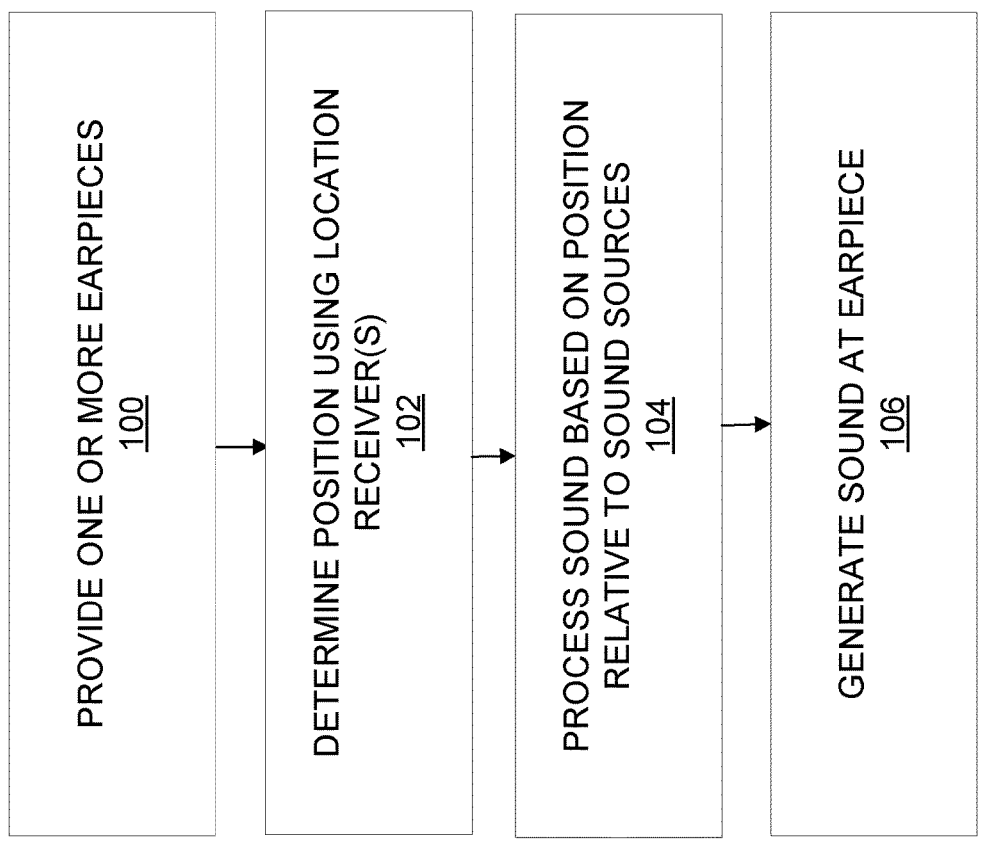
FIG. 2 is a flowchart displaying earpieces using location receivers to determine position and process sound.

FIG. 2 displays a flowchart with one methodology. In step 100, one or more earpieces 100 are provided. In step 102, the position of one or both earpieces using location receivers is determined. In step 104, processing sound based on the position of the location receiver relative to other sound sources 104 is performed. In step 106, sound is generated at the earpiece 106.

The sound generated may take into account the position of the user (or their left and/or right earpiece) relative to a position of one or more sound sources so that the sound generated may appear to have the same or a similar directionality as if generated by the one or more sound sources. Where more than one earpiece is present location information may be communicated between earpieces. Thus, each earpiece may independently calculate position where both earpieces include a location receiver. Alternatively, one earpiece may calculate position and the position of the other earpiece may be determined based on an offset in position between the two earpieces. The sound generated at each ear piece may take into account the position of the user.

Figure 3:
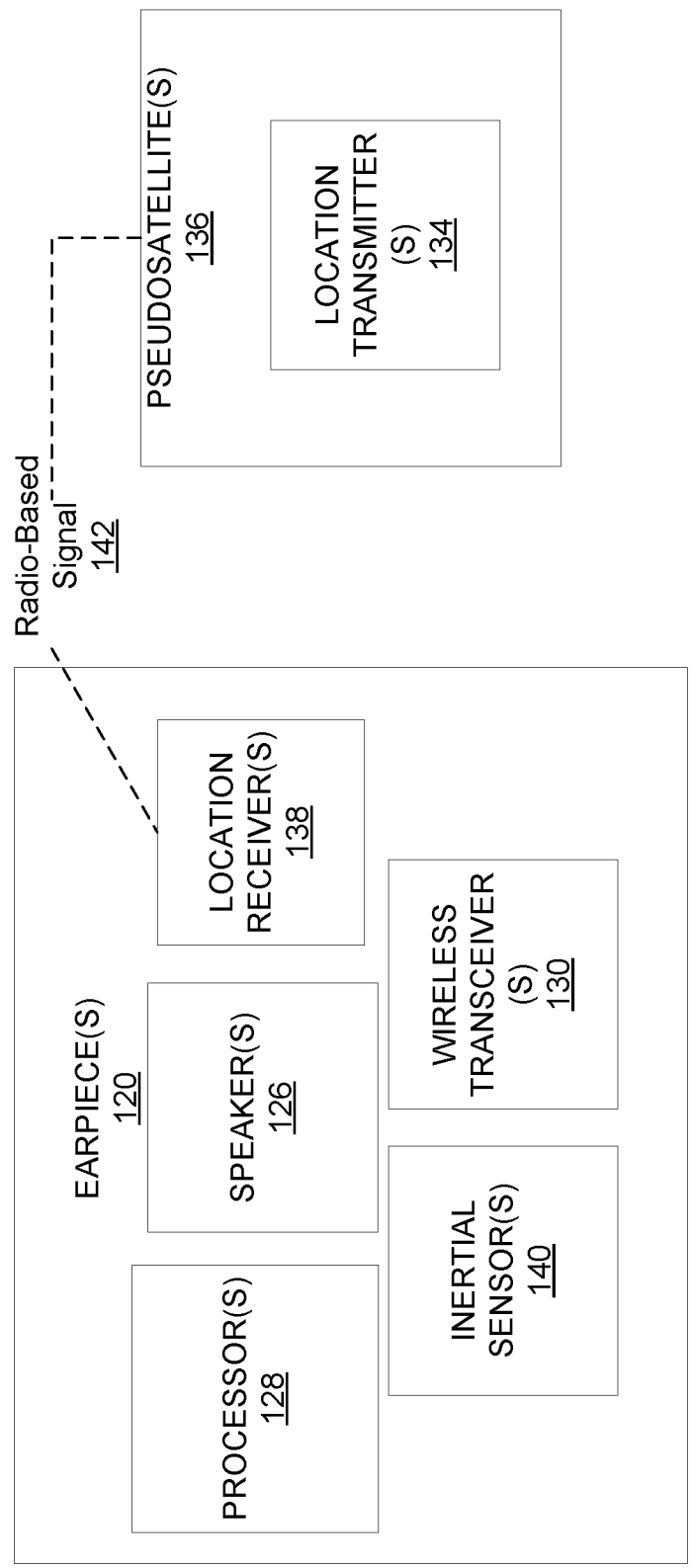
FIG. 3 is a block diagram of wireless earpiece components receiving a radio-based signal from location transmitters in accordance with the illustrative embodiments.

FIG. 3 displays a block diagram of the earpieces 120 receiving a radio-based signal 142 from the location transmitters 134 in the pseudosatellites 136. Different forms of this communication may occur. The radio-based signal 142 may use amplitude, angle, frequency, or phase modulation to convey information or signal indicative of position or from which position may be derived. Other embodiments may include the communication between the earpieces and the pseudolites in FIG. 3. The location transmitter 134 in the pseudolite 136 may communicate with other location transmitters in other pseudolites, with some pseudsatellites acting as master stations and other pseudolites as secondary stations. When the master pseudolite station, working with other stations, determines the location of the location receiver in the wireless earpiece, it may signal the location receiver 138, allowing the user to determine his/her location and to share it with others.

Figure 4:
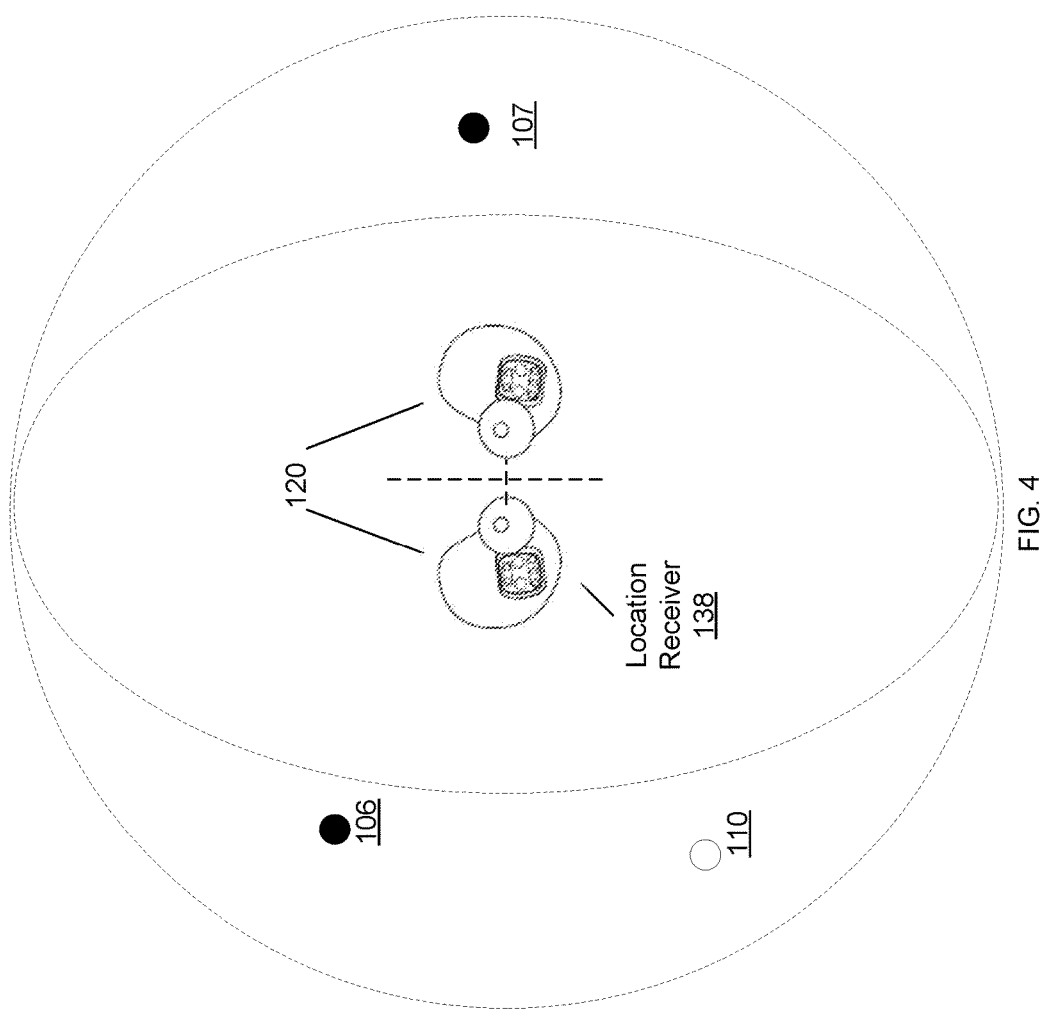
FIG. 4 is a pictorial representation of wireless earpieces communicating with location transmitters to determine the location source of a sound.

FIG. 4 displays another embodiment wherein the location receiver 138 of the earpieces 120 is used in determine earpiece position. Each earpiece 120 may independently determine location with its own location receiver 138 or alternatively, a single location receiver 138 in one of the earpieces 120 may be used and the location of the other earpiece may be determined by using an offset in position between the two earpieces. Sound sources 106, 107, 110 are located in various positions relative to a user wearing the earpieces 120. The earpiece 120 may use location information for the sound sources 106, 107, 110 and location information for the earpieces in order to create 3D audio effects including the localization of sound sources from behind, above, below, or to the side of the user. In some embodiments the ear pieces may occlude the ear canals of the user so that the user cannot hear ambient sound directly, but instead, ambient sound may be recreated at the ear piece including through the introduction of virtual sound which may require knowledge of the position of sound sources as well as knowledge of the position of the earpieces.

Pseudolites may be deployed in various environments for various reasons. One benefit over GPS is that pseudolites may be used in locations where GPS coverage is unlikely or unreliable such as where there are large structures or indoors or underground. Another advantage is that where it is important for greater accuracy, an environment may be configured to allow for greater accuracy such as by increasing the number of pseudolites or increasing the strength of their signals.

For example, pseudolites may be used at a plurality of different locations of a multi-floor shopping mall to allow for very precising location determination including height information.

Similarly, pseudolites may be used in a city center area or other urban area where there are large buildings. They could be used at a large concert venue, underground carparks, long tunnels, or other instances. It should be noted that for earpieces, it may be more important to have greater location accuracy the greater the number of people present and that in some embodiments the location of a sound source may be the location of another person who may also be wearing earpieces.

Although specific examples are described herein, the present invention contemplates numerous variations in the particular structure, components used, steps performed, and other variations.

What is claimed is:

1. An earpiece comprising:
   an earpiece housing;
   a location receiver disposed within the earpiece housing configured to receive signals from a plurality of ground-based transmitters and to determine location of the earpiece relative to the location of one or more sound sources based on the received signals;
   an inertial sensor disposed within the earpiece housing and configured to detect a movement of the earpiece;
   a digital sound processor disposed within the earpiece;
   wherein the earpiece is configured to refine orientation or the location of the earpiece based on the detected movement;
   wherein the earpiece is configured to generate three-dimensional sounds using the digital sound processor based on the location of the earpiece relative to location of one or more sound sources and the refined orientation or location of the earpiece.

2. The earpiece of claim 1 wherein plurality of ground-based transmitters comprises at least one or more pseudo satellites.

3. The earpiece of claim 1 wherein plurality of ground-based transmitters comprises at least one or more ground-based transmitters.

4. A system comprising:
   a plurality of pseudo satellites;
   a set of earpieces comprising a left earpiece and a right earpiece, each of the earpieces comprising:
      an earpiece housing,
      at least one speaker,
      an inertial sensor disposed of within the earpiece housing and configured to detect a movement of the earpiece;
      a digital sound processor disposed of within the earpiece, and
      a location receiver configured to receive signals from the plurality of pseudo satellites and to determine location of the earpiece relative to location of one or more sound sources based on the received signal;
   wherein the set of earpieces is configured to refine orientation or the location of the earpiece based on the detected movement; and
   wherein the digital sound processor is configured to generate three-dimensional sounds based on the location of the earpiece relative to one or more sound sources and the refined orientation or location of the earpiece.

5. The system of claim 4 wherein at least one of the earpieces is configured to determine location of the earpiece relative to a sound source using the location receiver.

6. The system of claim 5 wherein the set of earpieces is configured to generate three dimensional sound effects using location of the sound source and the location of the earpiece.

7. A method of operating an earpiece comprising steps of:
   determining position of the earpiece using a location receiver disposed within the earpiece and communications from a plurality of terrestrial-based location transmitters;
   refining the position of the earpiece or orientation of the earpiece based on inertial data sensor obtained from an inertial sensor of the earpiece;
   determining a position of a sound source;
   generating, by a digital sound processor of the earpiece, three-dimensional sound effects based on the position of the sound source and the refined position or orientation of the earpiece;
   producing the sound effects at the earpiece.

8. The method of claim 7 further comprising determining position of a second earpiece in operative communication with the earpiece using an offset.

9. The method of claim 8 further comprising generating three-dimensional sound effects for the second earpiece using the position of the sound source and the position of the second earpiece.

10. The method of claim 7 further comprising determining position of a second earpiece in operative communication with the earpiece independently using a location receiver within the second earpiece.

11. The method of claim 10 further comprising generating three-dimensional sound effects for the second ear piece using the position of the sound source and the position of the second earpiece.

12. The earpiece of claim 1 further comprising a wireless transceiver, wherein the wireless transceiver communications the location of the one or more sound sources to a second earpiece.

* * * * *